(12) United States Patent
Park

(10) Patent No.: US 12,438,200 B2
(45) Date of Patent: Oct. 7, 2025

(54) BATTERY CELL AND BATTERY SYSTEM INCLUDING THE SAME

(71) Applicant: LG Energy Solution, Ltd., Seoul (KR)

(72) Inventor: Jong Pil Park, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 669 days.

(21) Appl. No.: 17/787,618

(22) PCT Filed: Apr. 21, 2021

(86) PCT No.: PCT/KR2021/004999
§ 371 (c)(1),
(2) Date: Jun. 21, 2022

(87) PCT Pub. No.: WO2021/230516
PCT Pub. Date: Nov. 18, 2021

(65) Prior Publication Data
US 2022/0416314 A1    Dec. 29, 2022

(30) Foreign Application Priority Data
May 13, 2020  (KR) .................. 10-2020-0056952

(51) Int. Cl.
*H01M 10/42* (2006.01)
*H01M 10/48* (2006.01)
*H01M 50/533* (2021.01)

(52) U.S. Cl.
CPC ....... *H01M 10/425* (2013.01); *H01M 10/482* (2013.01); *H01M 50/533* (2021.01); *H01M 2010/4271* (2013.01)

(58) Field of Classification Search
CPC .............................................. H01M 2010/4271
See application file for complete search history.

(56) References Cited

U.S. PATENT DOCUMENTS 8,691,422 B2   4/2014  Ferber, Jr.
2009/0162741 A1  6/2009  Zheng et al.
(Continued)

FOREIGN PATENT DOCUMENTS

CN   1499214 A   5/2004
CN   201360156 Y  12/2009
(Continued)

OTHER PUBLICATIONS

International Search Report for PCT/KR2021/004999 dated Jul. 29, 2021. 3 pgs.
(Continued)

*Primary Examiner* — Brian R Ohara
(74) *Attorney, Agent, or Firm* — Lerner David LLP

(57) ABSTRACT

A battery cell includes: an electrode assembly; a case configured to accommodate the electrode assembly; a first lead electrode electrically connected to at least one of two electrode tabs of the electrode assembly; a conductive polymer including one surface that is in contact with one surface of the first lead electrode; and a second lead electrode including one surface that is in contact with the other surface of the conductive polymer, in which when a gap between the first lead electrode and the second lead electrode increases, resistance between the first lead electrode and the second lead electrode increases.

12 Claims, 4 Drawing Sheets

(56) References Cited

U.S. PATENT DOCUMENTS

| | | |
|---|---|---|
| 2010/0055558 A1 | 3/2010 | Choi et al. |
| 2014/0377633 A1 | 12/2014 | Kong |
| 2016/0141712 A1* | 5/2016 | Choi .................. H01M 50/227 |
| | | 320/112 |
| 2018/0275201 A1 | 9/2018 | Oguma et al. |
| 2019/0135111 A1 | 5/2019 | Poirier et al. |
| 2019/0165586 A1 | 5/2019 | Adachi et al. |
| 2019/0207196 A1 | 7/2019 | Park |
| 2019/0379032 A1 | 12/2019 | Park et al. |
| 2020/0006740 A1* | 1/2020 | Park .................... H01M 50/578 |
| 2020/0088805 A1 | 3/2020 | Cha |
| 2020/0136101 A1 | 4/2020 | Ardebili et al. |

FOREIGN PATENT DOCUMENTS

| | | |
|---|---|---|
| CN | 102136613 A | 7/2011 |
| CN | 104979504 A | 10/2015 |
| CN | 108627771 A | 10/2018 |
| CN | 110050362 A | 7/2019 |
| JP | 2004342476 A | 12/2004 |
| JP | 2009532843 A | 9/2009 |
| JP | 2012205383 A | 10/2012 |
| JP | 6479345 B2 | 3/2019 |
| JP | 2019049416 A | 3/2019 |
| JP | 2019103157 A | 6/2019 |
| JP | 2020-510978 A | 4/2020 |
| JP | 2020-511747 A | 4/2020 |
| KR | 20070099430 A | 10/2007 |
| KR | 100891078 B1 | 3/2009 |
| KR | 20150115251 A | 10/2015 |
| KR | 20170063038 A | 6/2017 |
| KR | 20180119106 A | 11/2018 |
| KR | 20190027615 A | 3/2019 |
| KR | 20190083217 A | 7/2019 |
| KR | 102083162 B1 | 3/2020 |
| KR | 20200050296 A | 5/2020 |

OTHER PUBLICATIONS

Search Report dated Apr. 1, 2025 from the Office Action for Chinese Application No. 202180008406.2 Issued Apr. 3, 2025, pp. 1-3.

* cited by examiner

[Figure 1]
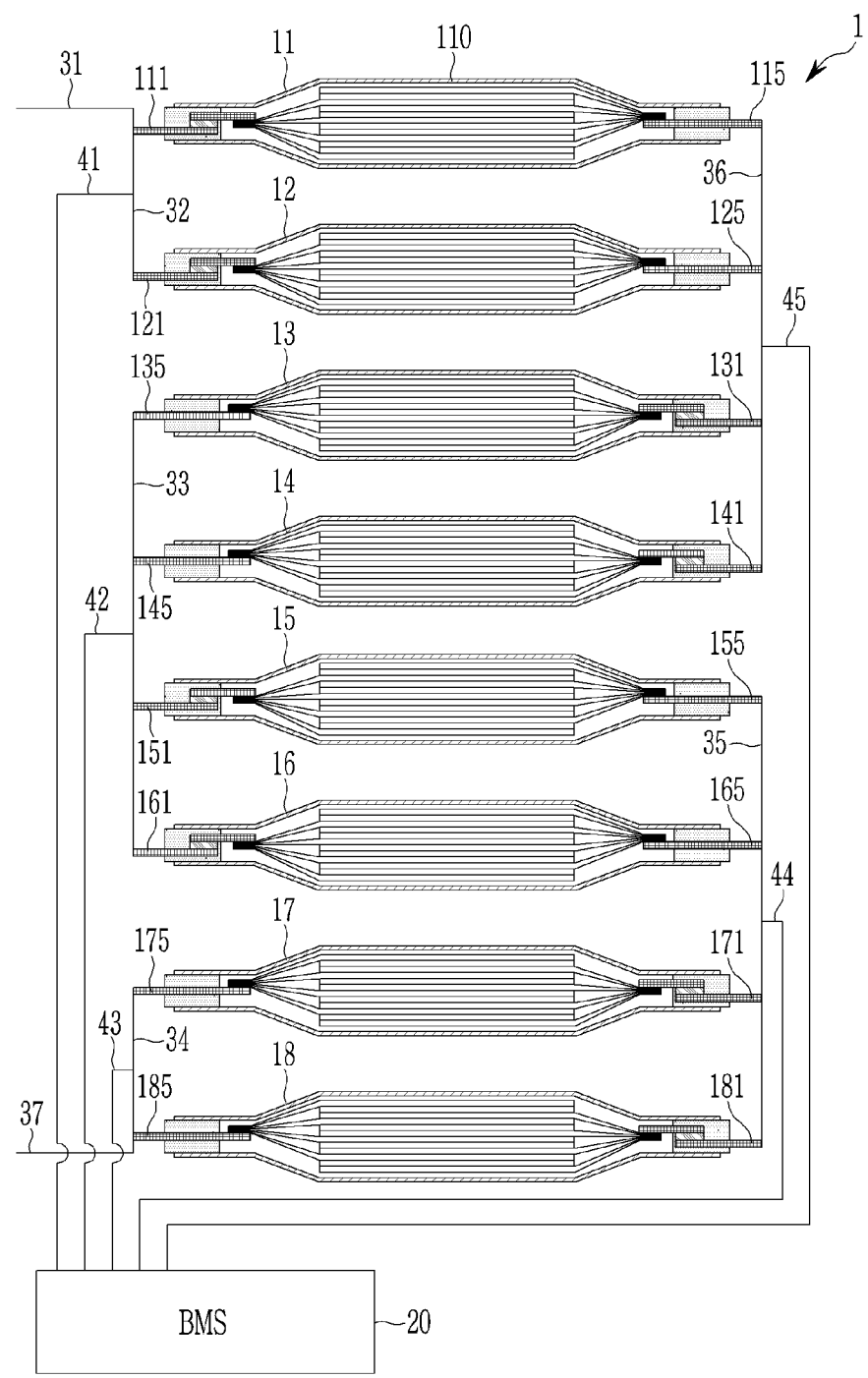

[Figure 2]
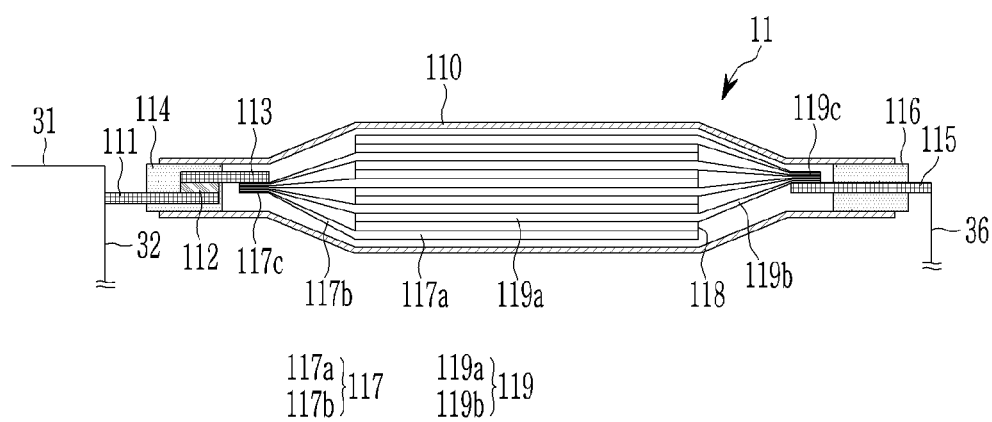
[Figure 3]
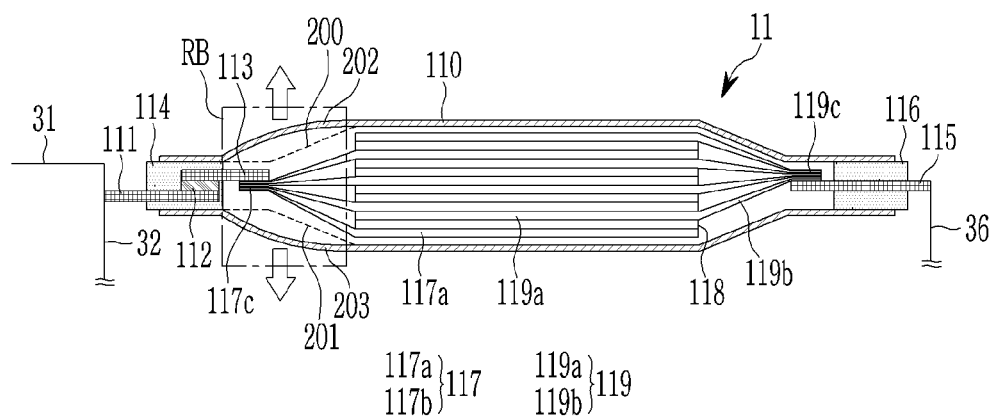

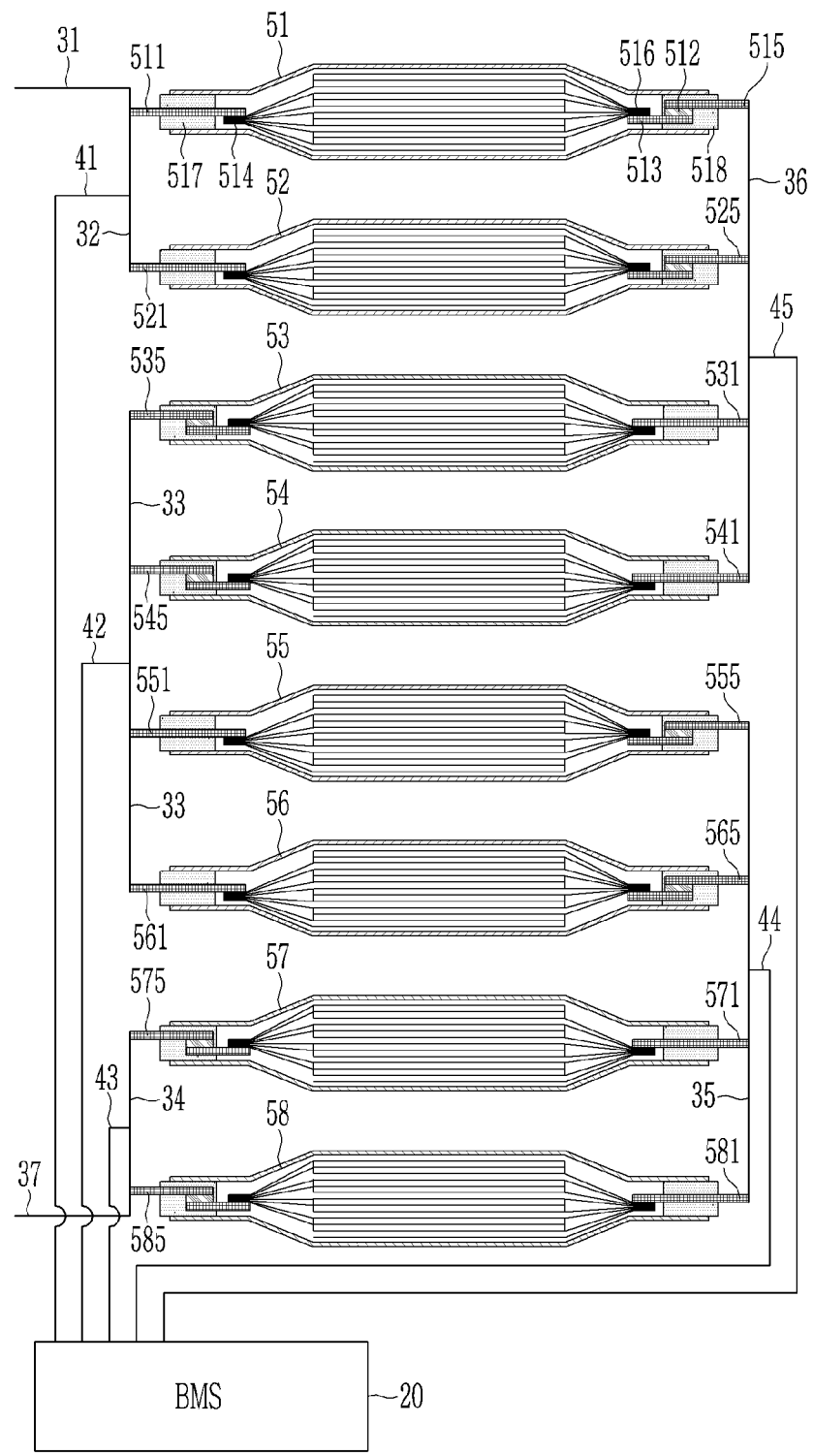
[Figure 4]

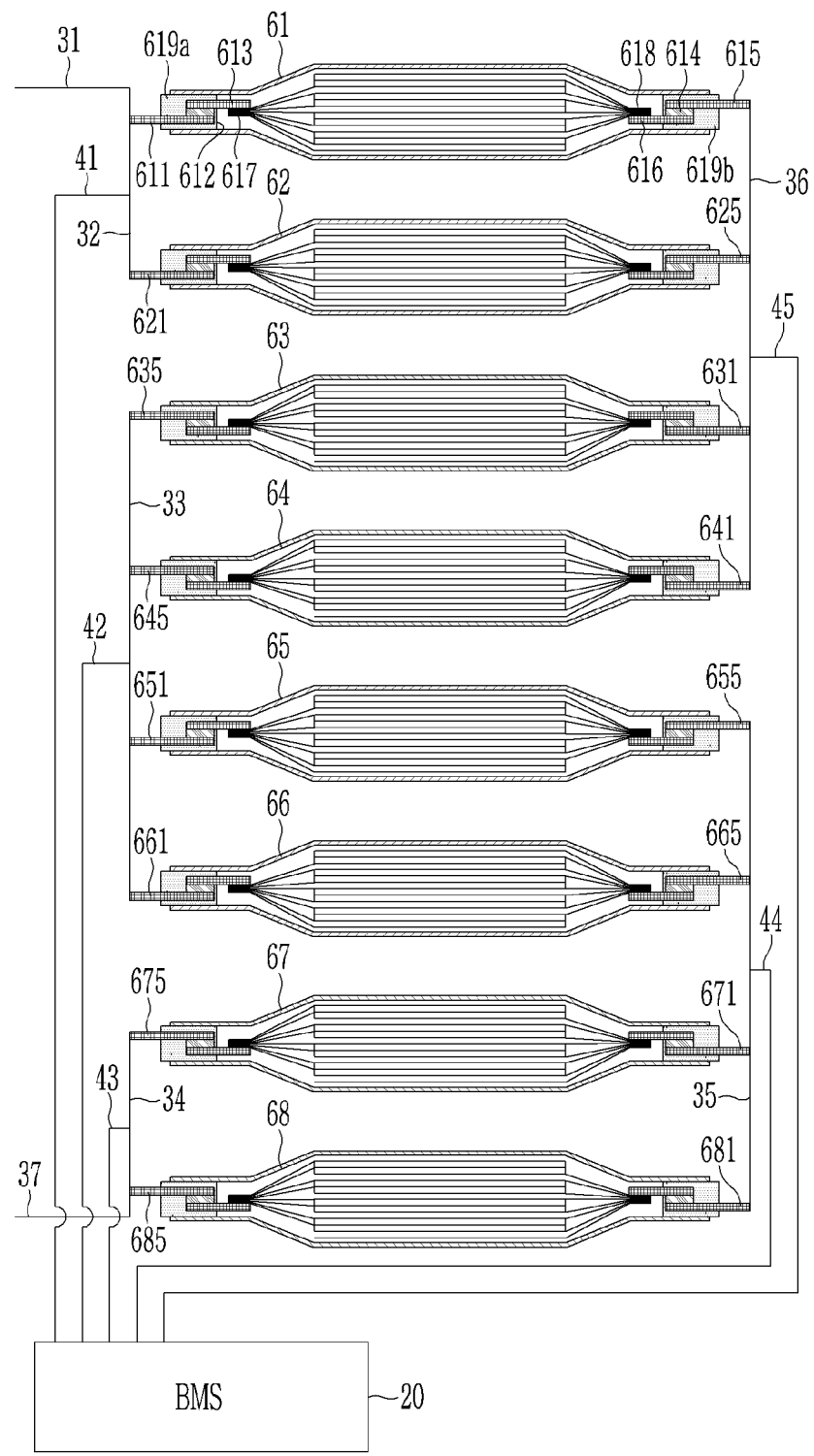
【Figure 5】

BATTERY CELL AND BATTERY SYSTEM INCLUDING THE SAME

CROSS-REFERENCE TO RELATED APPLICATION

The present application is a national phase entry under 35 U.S.C. § 371 of International Application No. PCT/KR2021/004999 filed Apr. 21, 2021, which claims priority from Korean Patent Application No. 10-2020-0056952 filed May 13, 2020, all of which are incorporated herein by reference.

TECHNICAL FIELD

The present disclosure relates to a battery cell and a battery system including the same.

BACKGROUND ART

It is difficult to accurately check a change in a battery caused by internal and external peculiarities. Even after a vent occurs, the battery may continue to operate and the battery may be operated in the state where the inside of a battery cell is exposed to the air. Further, gas may be generated due to a problem of a battery cell during an operation of an electric vehicle, so that the operation of the battery may be stopped to cause an accident.

As described above, it is difficult to accurately recognize the state of the battery cell, various problems may occur.

SUMMARY

Technical Problem

The present invention provides a battery cell and a battery system which are capable of detecting battery abnormality.

Technical Solution

A battery cell according to one characteristic of the present invention includes: an electrode assembly; a case configured to accommodate the electrode assembly; a first lead electrode electrically connected to at least one of two electrode tabs of the electrode assembly; a conductive polymer including a first surface that is in contact with a first surface of the first lead electrode; and a second lead electrode including a first surface that is in contact with a second surface of the conductive polymer, in which the first lead electrode and the second lead electrode are positioned such that an increase a gap between the first lead electrode and the second lead electrode corresponds to an increase in resistance between the first lead electrode and the second lead electrode.

The battery cell may further include a film configured to surround a region including a portion in which the first lead electrode, the conductive polymer, and the second lead electrode overlap.

The second lead electrode may protrude to an exterior of the case and may be connected to a bus bar.

A battery system according to another characteristic of the present invention includes: a plurality of battery cells; and a battery management system, in which each of the a plurality of battery cells includes: an electrode assembly; a case configured to accommodate the electrode assembly; a first lead electrode electrically connected to at least one of two electrode tabs of the electrode assembly; a conductive polymer including a first surface that is in contact with a first surface of the first lead electrode; and a second lead electrode including a first surface that is in contact with a second surface of the conductive polymer, and the battery management system is configured to: detect an increase in resistance of at least one of the plurality of battery cells; and diagnose an abnormality based on the detected increase in resistance.

The battery management system is configured to generate an inspection signal in response to a resistance increase speed of at least one of the plurality of battery cells reaching a predetermined threshold value that is equal to or smaller than a first reference value.

The battery management system is configured to generate a warning signal in response to the resistance increase speed of at least one of the plurality of battery cells reaching the predetermined threshold value at a higher speed than the first reference value.

The battery management system is configured to generate an evacuation warning signal in response to the resistance increase speed of at least one of the plurality of battery cells reaching the predetermined threshold value by a second reference value or more that is larger than the first reference value.

Each of the plurality of battery cells may further include a film configured to surround a region including a portion in which the first lead electrode, the conductive polymer, and the second lead electrode overlap.

The second lead electrode may protrude to an exterior of the case and may be connected to a bus bar.

The battery management system may be configured to supply a diagnosis voltage to both ends of at least one of the plurality of battery cells, measure a diagnosis current flowing in said at least one of the plurality of battery cells, and calculate a resistance of said at least one of the plurality of battery cells.

Advantageous Effects

The present invention provides the battery cell and the battery system providing a warning for abnormality of a battery cell.

BRIEF DESCRIPTION OF THE DRAWINGS

FIG. 1 is a diagram illustrating a battery system according to an exemplary embodiment.

FIG. 2 is a diagram illustrating a battery cell according to the exemplary embodiment.

FIG. 3 is a diagram illustrating the case where abnormality occurs in one of a plurality of battery cells.

FIG. 4 is a diagram illustrating a battery system according to an exemplary embodiment.

FIG. 5 is a diagram illustrating a battery system according to an exemplary embodiment.

DETAILED DESCRIPTION

Hereinafter, an exemplary embodiment disclosed the present specification will be described in detail with reference to the accompanying drawings, and the same or similar constituent element is denoted by the same reference numeral regardless of a reference numeral, and a repeated description thereof will be omitted. Suffixes, "module" and "unit" for a constituent element used for the description below are given or mixed in consideration of only easiness of the writing of the specification, and the suffix itself does not have a discriminated meaning or role. Further, in describing the exemplary embodiment disclosed in the present disclosure, when it is determined that detailed description relating to well-known functions or configurations may make the subject matter of the exemplary embodiment disclosed in the present disclosure unnecessarily ambiguous, the detailed description will be omitted. Further, the accompanying drawings are provided for helping to easily understand exemplary embodiments disclosed in the present specification, and the technical spirit disclosed in the present specification is not limited by the accompanying drawings, and it will be appreciated that the present invention includes all of the modifications, equivalent matters, and substitutes included in the spirit and the technical scope of the present invention.

Terms including an ordinary number, such as first and second, are used for describing various constituent elements, but the constituent elements are not limited by the terms. The terms are used only to discriminate one constituent element from another constituent element.

It should be understood that when one constituent element is referred to as being "coupled to" or "connected to" another constituent element, one constituent element can be directly coupled to or connected to the other constituent element, but intervening elements may also be present. By contrast, when one constituent element is referred to as being "directly coupled to" or "directly connected to" another constituent element, it should be understood that there are no intervening elements.

In the present application, it will be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance.

Hereinafter, an exemplary embodiment of the present invention will be described with reference to the drawings.

FIG. 1 is a diagram illustrating a battery system according to an exemplary embodiment.

FIG. 2 is a diagram illustrating a battery cell according to the exemplary embodiment.

As illustrated in FIG. 1, a battery system 1 includes a plurality of battery cells 11 to 18 and a Battery Management System (BMS) 20. FIG. 1 illustrates the case where the battery system 1 includes eight battery cells 11 to 18, but this is one example, and the present invention is not limited thereto. Further, FIG. 1 illustrates that two battery cells are connected in parallel to form one bank, but the plurality of battery cells 11 to 18 may be serially connected or three or more battery cells are connected in parallel to form a bank.

The BMS 20 may control a charge/discharge current of the battery system 1, and measure a cell voltage of each of the plurality of battery cells 11 to 18 and control a cell balancing operation, and control a protection operation based on a temperature and a cell voltage of each of the plurality of battery cells 11 to 18.

The BMS 20 according to the exemplary embodiment may detect an abnormal battery cell that is likely to be vented among the plurality of battery cells 11 to 18, and when the abnormal battery cell is detected, the BMS 20 may stop the operation of the plurality of battery cells 11 to 18 and warn the outside that there is an abnormality.

As illustrated in FIG. 2, a battery cell 11 may include an electrode assembly in which a positive electrode layer 117, an isolation layer 118, and a negative electrode layer 119 are repeatedly stacked in the order of the positive electrode layer 117, the isolation layer 118, and the negative electrode layer 119 and a case 110. The positive electrode layer 117 includes a positive electrode 117a and a positive electrode tab 117b, and the positive electrode tab 117b is extended from the positive electrode 117a and protrudes to one side of the case 110 to be connected with a positive electrode lead 117c. The negative electrode layer 119 includes a negative electrode 119a and a negative electrode tab 119b, and the negative electrode tab 119b is extended from the negative electrode 119a and protrudes to the other side of the case 110 to be connected with a negative electrode lead 119c. The case 110 accommodates the electrode assembly.

In FIGS. 1 and 2, the positive electrode tab and the negative electrode tab protrude in opposite directions, but the present invention is not limited thereto. The present invention is applicable even to a battery system including a battery cell in which a positive electrode tab and a negative electrode tab protrude in the same direction.

The positive lead 117c is electrically connected to a lead electrode 113, the lead electrode 113 and a lead electrode 111 are electrically connected through a conductive polymer 112, and the lead electrode 111 is electrically connected to a bus bar 32.

In particular, a part of a lower end surface of the lead electrode 113 (a part of a left lower end surface in FIG. 2) is in contact with the positive electrode tab 117b, another part of the lower end surface of the lead electrode 113 (a part of a right lower end surface in FIG. 2) and a part of an upper end surface of the lead electrode 111 (a part of a left upper end surface in FIG. 2) overlap each other, and the conductive polymer 112 is located therebetween.

The negative electrode lead 119c is electrically connected to a lead electrode 115, and the lead electrode 115 is connected to a bus bar 36.

A film 114 surrounds a region including a portion in which the lead electrode 111, the lead electrode 113, and the conductive polymer 112 overlap. A film 116 surrounds a partial region of the lead electrode 115.

The case 110 accommodates the electrode assembly, the lead electrode 111 protrudes to the outside through an opening at one side of the case 110 to be connected to the bus bar 32, and the lead electrode 115 is connected to the bus bar 36 through an opening at the other side of the case 110. The opening at one side is sealed by the film 114, or by the film 114 and a sealant, and the opening at the other side may be sealed by the film 116, or by the film 116 and a sealant.

The plurality of battery cells 12 to 18 may be implemented in the same structure as that of the battery cell 11.

Referring back to FIG. 1, the battery system 1 will be described.

The lead electrode 111 that is the positive electrode of the battery cell 11 and the lead electrode 121 that is the positive electrode of the battery cell 12 are connected to the bus bar 32, and the bus bar 32 is connected to a positive electrode 31 of the battery system 1. The lead electrodes 115 and 125 that are the negative electrodes of the battery cells 11 and 12 and the lead electrodes 131 and 141 that are the positive electrodes of the battery cells 13 and 14 are connected to the bus bar 36, lead electrodes 135 and 145 that are the negative electrodes of the battery cells 13 and 14 and lead electrodes 151 and 161 that are the positive electrodes of the battery cells 15 and 16 are connected to the bus bar 33, lead electrodes 155 and 165 that are the negative electrodes of the battery cells 15 and 16 and lead electrodes 171 and 181 that are the positive electrodes of the battery cells 17 and 18 are connected to the bus bar 35, and lead electrodes 175 and 185 that are the negative electrodes of the battery cells 17 and 18 are connected to a bus bar 34. The bus bar 34 is connected to a negative electrode 37 of the battery system 1.

The BMS 20 may supply a diagnosis voltage between two bus bars among the plurality of bus bars 32 to 36, and measure resistance of the battery bank. As mentioned above, in FIG. 1, two adjacent battery cells are connected to each other in parallel to configure one battery bank. However, the invention is not limited thereto, the battery cells are serially connected like the method illustrated in FIG. 1 in the unit of one battery cell, instead of the battery bank, or the battery bank may include at least three battery cells.

The BMS 20 measures resistance of the plurality of battery banks including two battery cells among the plurality of battery cells 11 to 18, and when the resistance of the battery bank is equal to or larger than a predetermined value, the BMS 20 diagnoses that the corresponding battery bank has abnormality.

For example, it is described that the BMS 20 measures the resistance of the battery bank consisting of two battery cells 11 and 12 among the plurality of battery cells 11 to 18.

FIG. 3 is a diagram illustrating the case where abnormality occurs in one of a plurality of battery cells.

In FIG. 3, gas is generated in the battery cell 11 and the case 110 is expanded from indicated dotted lines 200 and 201 to indicated solid lines 202 and 203 in a dotted box region RB. This is one example for describing the exemplary embodiment, and the present invention is not limited thereto.

The BMS 20 supplies a diagnosis voltage between the bus bar 32 and the bus bar 36 through a wire 41 and a wire 45. In this case, the diagnosis current flowing through the battery cells 11 and 12 is summed and flows through the wire 41 and the wire 45, and the BMS 20 may measure a diagnosis voltage and the diagnosis current to calculate the resistance of the battery bank.

As illustrated in FIG. 3, when an abnormality occurs in the battery cell 11 among the battery cells 11 and 12 and gas is generated, the entire resistance of the battery bank increases. A gap between the lead electrode 113 and the lead electrode 111 is increased due to an increase in pressure inside the battery cell 11. This is due to the force acting in the two arrow directions of the drawing by the internal pressure of the battery cell 11. Then, the conductive polymer 112 is expanded by force acted in both vertical directions. As the gap between the two lead electrodes 111 and 113 increases, the resistance between the two lead electrodes increases, and the battery bank resistance calculated by the BMS 20 increases.

By the same method, the BMS 20 may supply the diagnosis voltage between the bus bar 36 and the bus bar 33 through the wire 45 and the wire 42 in order to diagnose abnormalities of the battery cells 13 and 14, and measure the diagnosis current flowing through the wire 41 and the wire 45 and calculate the resistance of the battery bank. The BMS 20 may supply the diagnosis voltage between the bus bar 33 and the bus bar 36 through the wire 42 and the wire 44 in order to diagnose abnormalities of the battery cells 15 and 16, and measure the diagnosis current flowing through the wire 42 and the wire 44 and calculate the resistance of the battery bank. The BMS 20 may supply the diagnosis voltage between the bus bar 35 and the bus bar 34 through the wire 44 and the wire 43 in order to diagnose abnormalities of the battery cells 17 and 18, and measure the diagnosis current flowing through the wire 44 and the wire 43 and calculate the resistance of the battery bank.

The BMS 20 divides the measured diagnosis current by the supplied diagnosis voltage and calculates the resistance of the corresponding battery bank. In this case, when a resistance increase speed of the battery bank is low, but reaches a threshold value, the BMS 20 may generate an inspection signal. When the increase speed is equal to or lower than a predetermined first reference value, it may be determined that the resistance increase speed is low, and the predetermined reference value may be set according to a design. Further, when the resistance of the battery bank reaches the threshold value at a rapid increase speed, the BMS 20 may generate a warning signal. When the increase speed is larger than the first reference value, the BMS 20 may determine that the resistance increase speed is high. Further, when the resistance of the battery bank reaches the threshold value at a very rapid increase speed, there is a risk of ignition, so that the BMS 20 may generate an evacuation warning signal. When the increase speed is larger than a predetermined second reference value that is larger than the first reference value, the BMS 20 may determine that the resistance increase speed is very high.

The BMS 20 may stop the operation of the battery system 1 according to the inspection signal, the warning signal, and the evacuation warning signal, and transmit the stop of the operation of the battery system 1 to a circuit controlling the vehicle through the CAN communication, and notify a user of an abnormality of the battery system 1 through a separate device. The inspection signal is a signal to inform the user that the battery system needs to be inspected, the warning signal is a signal to inform the user that the battery system is in a dangerous state and needs replacement, and the evacuation warning signal is a signal to warn the user to evacuate immediately. The response matter according to each signal may be appropriately designed according to the design.

FIGS. 1 to 3 illustrate that the lead electrode, the conductive polymer, and the lead electrode are located at both sides of the battery cell, but the invention is not limited thereto.

FIG. 4 is a diagram illustrating a battery system according to an exemplary embodiment.

As illustrated in FIG. 4, a lead electrode 513 is electrically connected to a negative electrode lead 516, a conductive polymer 512 is located between the lead electrode 513 and the lead electrode 515, and the lead electrode 515 is connected to a bus bar 36. A film 518 surrounds a region including a portion in which the lead electrode 513, the conductive polymer 512, and the lead electrode 515 overlap. The lead electrode 511 is connected to a positive electrode lead 514 and a bus bar 32. The film 517 surrounds a partial region of the lead electrode 511.

A lead electrode 511 that is a positive electrode of a battery cell 51 and a lead electrode 521 that is a positive electrode of a battery cell 52 are connected to the bus bar 32, and the bus bar 32 is connected to the positive electrode 31 of the battery system 1. Lead electrodes 515 and 525 that are the negative electrodes of the battery cells 51 and 52 and lead electrodes 531 and 541 that are the positive electrodes of the battery cells 53 and 54 are connected to the bus bar 36, lead electrodes 535 and 545 that are the negative electrodes of the battery cells 53 and 54 and lead electrodes 551 and 561 that are the positive electrodes of the battery cells 55 and 56 are connected to a bus bar 33, lead electrodes 555 and 565 that are the negative electrodes of the battery cells 55 and 56 and lead electrodes 571 and 581 that are the positive electrodes of the battery cells 57 and 58 are connected to a bus bar 35, and lead electrodes 575 and 585 that are the negative electrodes of the battery cells 57 and 58 are connected to a bus bar 34. The bus bar 34 is connected to a negative electrode 37 of the battery system 1.

Identically to the exemplary embodiment of FIG. 1, the BMS 20 of the exemplary embodiment of FIG. 4 may supply a diagnosis voltage between two bus bars among the plurality of bus bars 32 to 36, and measure resistance of the battery bank. A detailed description thereof will be omitted.

FIG. 5 is a diagram illustrating a battery system according to an exemplary embodiment.

As illustrated in FIG. 5, a lead electrode 613 is electrically connected to a positive electrode lead 617, a conductive polymer 612 is located between the lead electrode 613 and the lead electrode 611, and the lead electrode 611 is connected to a bus bar 32. A lead electrode 616 is electrically connected to a negative electrode lead 618, a conductive polymer 614 is located between the lead electrode 616 and the lead electrode 615, and the lead electrode 615 is connected to a bus bar 36. A film 619a surrounds a region including a portion in which the lead electrode 613, the conductive polymer 612, and the lead electrode 611 overlap, and a film 619b surrounds a region including a portion in which the lead electrode 616, the conductive polymer 614, and the lead electrode 615 overlap.

A lead electrode 611 that is a positive electrode of a battery cell 61 and a lead electrode 621 that is a positive electrode of a battery cell 62 are connected to the bus bar 32, and the bus bar 32 is connected to a positive electrode 31 of the battery system 1. Lead electrodes 615 and 625 that are the negative electrodes of the battery cells 61 and 62 and lead electrodes 631 and 641 that are the positive electrodes of the battery cells 63 and 64 are connected to the bus bar 36, lead electrodes 635 and 645 that are the negative electrodes of the battery cells 63 and 64 and lead electrodes 651 and 661 that are the positive electrodes of the battery cells 65 and 66 are connected to a bus bar 33, lead electrodes 655 and 665 that are the negative electrodes of the battery cells 65 and 66 and lead electrodes 671 and 681 that are the positive electrodes of the battery cells 67 and 68 are connected to a bus bar 35, and lead electrodes 675 and 685 that are the negative electrodes of the battery cells 67 and 68 are connected to a bus bar 34. The bus bar 34 is connected to a negative electrode 37 of the battery system 1.

Identically to the exemplary embodiment of FIG. 1, the BMS 20 of the exemplary embodiment of FIG. 5 may supply a diagnosis voltage between two bus bars among the plurality of bus bars 32 to 36, and measure resistance of the battery bank. A detailed description thereof will be omitted.

In the foregoing exemplary embodiment, the BMS 20 detects abnormality based on an increase speed of resistance, but the invention is not limited thereto, and the present invention may detect that there is abnormality in a battery cell or a battery bank having a resistance value equal to or larger than a predetermined threshold value compared to other battery cells or battery bank.

The battery system according to the exemplary embodiment is applicable to an Energy Storage System (ESS), as well as a vehicle, and when the signal generated from the BMS 20 interlocks with the firefighting equipment, a fire suppression operation may be performed when ignition occurs due to abnormality of the ESS. For example, a fire alarm device may be operated and a fire door may be activated.

While this invention has been described in connection with what is presently considered to be practical exemplary embodiments, it is to be understood that the invention is not limited to the disclosed embodiments.

The invention claimed is:

1. A battery cell, comprising:
an electrode assembly;
a case configured to accommodate the electrode assembly;
a first lead electrode electrically connected to at least one of two electrode tabs of the electrode assembly;
a conductive polymer including a first surface that is in contact with a first surface of the first lead electrode; and
a second lead electrode including a first surface that is in contact with a second surface of the conductive polymer,
wherein the conductive polymer is positioned between first lead electrode and the second lead electrode and wherein an interface between the conductive polymer and the first and second lead electrodes is configured such that an increase in internal pressure of the electrode assembly within the case causes the conductive polymer to expand, wherein expansion of the conductive polymer increases a distance between the first lead electrode and the second lead electrode through the conductive polymer and correspondingly increases a resistance between the first lead electrode and the second lead electrode.

2. The battery cell of claim 1, further comprising:
a film configured to surround a region including a portion in which the first lead electrode, the conductive polymer, and the second lead electrode overlap.

3. The battery cell of claim 1, wherein:
the second lead electrode protrudes to an exterior of the case and is connected to a bus bar.

4. A battery system, comprising:
a plurality of battery cells; and
a battery management system,
wherein each battery cell of the plurality of battery cells includes:
an electrode assembly;
a case configured to accommodate the electrode assembly;
a first lead electrode electrically connected to at least one of two electrode tabs of the electrode assembly;
a conductive polymer including a first surface that is in contact with a first surface of the first lead electrode; and
a second lead electrode including a first surface that is in contact with a second surface of the conductive polymer, wherein the conductive polymer is positioned between first lead electrode and the second lead electrode and wherein an interface between the conductive polymer and the first and second lead electrodes is configured such that an increase in internal pressure of the electrode assembly within the case causes the conductive polymer to expand, wherein expansion of the conductive polymer increases a distance between the first lead electrode and the second lead electrode through the conductive polymer and correspondingly increases a resistance between the first lead electrode and the second lead electrode and an overall resistance of the battery cell,
wherein the battery management system is configured to:
detect the increase in the overall resistance of at least one of the plurality of battery cells; and
diagnose an abnormality based on the detected increase in the overall resistance.

5. The battery management system of claim 4, wherein:
the battery management system is configured to generate an inspection signal in response to a resistance increase speed of at least one of the plurality of battery cells reaching a predetermined threshold value that is equal to or smaller than a first reference value.

6. The battery management system of claim 5, wherein: the battery management system is configured to generate a warning signal in response to the resistance increase speed of at least one of the plurality of battery cells reaching the predetermined threshold value at a higher speed than the first reference value.

7. The battery management system of claim 5, wherein: the battery management system is configured to generate an evacuation warning signal in response to the resistance increase speed of at least one of the plurality of battery cells reaching the predetermined threshold value by a second reference value or more that is larger than the first reference value.

8. The battery management system of claim 4, wherein: each of the plurality of battery cells further includes a film configured to surround a region including a portion in which the first lead electrode, the conductive polymer, and the second lead electrode overlap.

9. The battery management system of claim 4, wherein: the second lead electrode protrudes to an exterior of the case and is connected to a bus bar.

10. The battery management system of claim 4, wherein: the battery management system is configured to:
supply a diagnosis voltage to both ends of at least one of the plurality of battery cells;
measure a diagnosis current flowing in said at least one of the plurality of battery cells; and
calculate a resistance of said at least one of the plurality of battery cells.

11. The battery cell of claim 1, wherein the interface between the conductive polymer and the first and second lead electrodes is configured such that an increase in internal pressure of the electrode assembly within the case causes the conductive polymer to increase the distance between the first lead electrode and the second lead electrode before the conductive polymer partially separates from either the first lead electrode or the second lead electrode.

12. The battery management system of claim 4, wherein the battery management system is configured to detect the increase in the overall resistance of at least one of the plurality of battery cells before the conductive polymer partially separates from either the first lead electrode or the second lead electrode.

\* \* \* \* \*